(12) United States Patent
Zygmunt

(10) Patent No.: US 6,416,058 B1
(45) Date of Patent: Jul. 9, 2002

(54) PACKING SEAL WITH DYNAMIC SELF-ADAPTING LIP

(76) Inventor: Marian Gorski Zygmunt, 111, avenue du Clos Vert, 60700 Fleurines (FR)

( * ) Notice: Subject to any disclaimer, the term of this patent is extended or adjusted under 35 U.S.C. 154(b) by 0 days.

(21) Appl. No.: 09/600,197

(22) PCT Filed: Jan. 13, 1998

(86) PCT No.: PCT/FR99/00045

§ 371 (c)(1),
(2), (4) Date: Aug. 11, 2000

(87) PCT Pub. No.: WO99/36713

PCT Pub. Date: Jul. 22, 1999

(51) Int. Cl.$^7$ .............................. F16J 15/32; F16J 9/20
(52) U.S. Cl. ...................... 277/436; 277/441; 277/451; 277/466; 277/569; 277/572; 277/586
(58) Field of Search ................................ 277/436, 438, 277/439, 441, 451, 553, 572, 559, 586, 459, 466, 460, 491, 449, 569

(56) References Cited

U.S. PATENT DOCUMENTS

| | | | |
|---|---|---|---|
| 1,988,727 A | * | 1/1935 | Godron |
| 2,293,564 A | * | 8/1942 | Schnell |
| 2,387,855 A | * | 10/1945 | Phillips |
| 2,686,402 A | * | 8/1954 | Samuel |
| 2,867,482 A | * | 1/1959 | Schmidt |
| 2,871,071 A | * | 1/1959 | Brenneke |
| 3,306,620 A | * | 2/1967 | Taschenberg |
| 3,456,954 A | * | 7/1969 | Prasse et al. |
| 3,642,293 A | * | 2/1972 | Woodling |
| 3,762,728 A | * | 10/1973 | Prasse et al. |
| 3,921,988 A | * | 11/1975 | Prasse et al. |
| 4,676,143 A | * | 6/1987 | Nomura et al. ............... 92/243 |
| 5,085,185 A | * | 2/1992 | Heshmat ..................... 123/193 |
| 5,133,563 A | * | 7/1992 | Casellato |
| 5,431,415 A | * | 7/1995 | Millonig et al. |

FOREIGN PATENT DOCUMENTS

| | | | |
|---|---|---|---|
| EP | 0418732 A1 | * | 3/1991 |
| FR | 2121058 | * | 7/1972 |

* cited by examiner

*Primary Examiner*—Anthony Knight
*Assistant Examiner*—Alison K. Pickard
(74) *Attorney, Agent, or Firm*—Rothwell, Figg, Ernst & Manbeck, P.C.

(57) ABSTRACT

The invention concerns a packing seal with its lip (1) placed in a toroidal housing (2) of a part (3) mobile in rotation and/or translation relatively to a part (4) and whereof the lip (5) ensuring the seal between the lining and the part (4) exerts on said part (4) an almost constant force whatever the pressure and whereof the support diameter can be maintained also almost constant whatever the temperature. Said pressure and temperature compensation is obtained by giving the ring (6) an L-shape and by causing the lip (5) corresponding to the vertical portion of the L-shape to pivot by rotation or flexion of the horizontal portion (7) under the effect of pressure to increase the contact pressure of the lip (5) on the part (4) and by placing in the lower part of the horizontal portion (7) an insert (11) with greater thermal expansion coefficient causing flexion of the horizontal portion (7) for a rise in temperature and by rotating the lip (5) to maintain its contact diameter constant, despite the mean diameter increase of the ring (6).

11 Claims, 8 Drawing Sheets

PACKING SEAL WITH DYNAMIC SELF-ADAPTING LIP

BACKGROUND OF THE INVENTION

1. Field of the Invention

This invention concerns a packing seal between two parts of same geometric nature mobile in translation relatively to each other and/or between two coaxial parts mobile in rotation relatively to each other for use at high temperatures and/or under high pressure and/or speed conditions.

2. Description of the Related Art

Sealing is a function that becomes more and more important in mechanics because of the increasing use of fluids in the (hydraulic, pneumatic) drivers and in the controls, and also because of the great number and diversity of the mechanical components. The containment of a gas or a liquid is by nature difficult to obtain. Even a small leak can have multiple consequences, as to the availability of the material as well as to the operation itself and the safety. Well-known examples show that very complex units can become quite dysfunctional because of a simple leak.

Two types of sealing can be distinguished:
- in the static mode, the junction must usually be removable, at least from time to time; the assembled surfaces are varied: planes, spheres, cylinders, cones, etc.;
- in the dynamic mode, the junction is such that one of the two surfaces is mobile relatively to the other one, said surfaces often being of the same geometrical nature.

The packing seals for parts in translation or in rotation relatively to one another have quite a large field of applications, from the internal-combustion engine to power cylinders or turbine shafts.

In most cases, the sealing of the surfaces in relative motion must be achieved both at standstill and when these surfaces are in motion, whatever their motion speed, all the while originating as little effort as possible. There are already many solutions depending on the type of use but they are limited as to the speed, the pressure or the temperature. The packing seal must indeed ensure the sealing between the two parts with a pressure difference between its two faces. This difference in pressure generates a frictional force that, associated to the relative displacement of the two parts, releases heat. In turn, this heat, by increasing the temperature of the unit, generates frictional forces due to the expansion of the parts in contact, forces that in turn increase the temperature until a temperature equilibrium is reached that must be lower than the maximum working temperature of the materials.

The sealing during a translation movement is most often achieved by using a seal that, integral to one of the two surfaces, will come in contact with the other surface, thus subjecting it to friction. Since the sealing must also be ensured at standstill, this seal must display, in addition to its characteristics of static seal, the best possible characteristics under friction, i,e.:
- minimum resistance to displacement,
- negligible abrasion.

The friction generates a heat often detrimental to the operating life. Yet it must be noted that in translation the surface in contact that slides with the seal changes reciprocatively, which facilitates the thermal flow. The resistance to displacement and to abrasion is a function of many parameters, the main ones being:
- the nature of the seal material,
- the nature of the material of the rubbing surface,
- the motion speed,
- the pressure,
- the fluid to be sealed,
- the quality of the mobile surface (hardness, roughness, etc.).

Elastomers are often used in this type of seal despite a rather high friction coefficient and a poor thermal conductivity. With elastomers, a seal lubrication is mandatory. The main families used are:
- the nitrites, especially with mineral oils;
- the silicones for temperatures up to 200° C., but they are little resistant to abrasion;
- the products containing fluorine also for temperatures up to 200° C.; they can be used with many chemicals and display good mechanical qualities;
- must be added the polyurethane, very resistant to abrasion but sensitive to some liquid fluids, water in particular.

It is important to note that the material of the seal in contact with the rubbing surface heats up; consequently, its temperature may become higher than the fluid temperature. If this latter is close to the temperature limit for the use of the elastomer, a degradation could occur. This is true also of the other materials, all the more so since their thermal conductivity coefficient is low. Polyamides are fairly often used for their relatively low friction coefficient. These materials being also very poor heat conductors, they are often charged with graphite or of molybdenum bisulfide powders (that lower further the friction coefficient) and with fine metal particles (copper, lead, etc.); yet the most advantageous is the PTFE (polytetrafluoroethylene more generally known under the trademark << Teflon>>) with its very low friction coefficient (0.1 to 0.05). The PTFE allows also to work in fluids up to 250° C. and, charged with graphite or molybdenum bisulfide, it can operate with very little lubrication if any, however under moderate pressure and speed conditions.

Metals are little used except for the rings, because of their tendency to jamming. Here too, lubrication is very important and quite mandatory. Cast iron and bronze are the two materials most commonly used. Graphite is a material fairly used for its low friction coefficient, for its good thermal transfer and for its high chemical inertia even at high temperature (400° C. in air). Asbestos is sometimes used in association with PTFE.

In the internal-combustion engines and the compressors, sealing is achieved with split rings. The sealing rings have a rectangular cross section and their sealing function regarding gases is achieved:
- by their outer face bearing on the cylinder.
- by their lower face bearing on the piston groove.

So as to obtain a good sealing, the section opening needed to create the elasticity necessary to apply the ring on the cylinder must be as low as possible. The ring split leaves a passageway for burning gases along the piston, generating a pollution of the oil and heating the piston; moreover, it quickly wears out the upper part of the cylinder because of the introduction of abrasive particles. Usually, three split rings are needed to ensure a sufficient sealing, while all the manufacturers struggle to limit the number of these rings, because of their detrimental influence on the engine mechanical efficiency. It is indeed possible to estimate that each ring lowers by $10^4$ Pa the mean effective pressure developed per engine. The non-negligible dispersal of various frictional losses in the internal-combustion engines does not hide the fact that almost half of these losses come from the piston-rings unit. In adequately optimized systems, most of these losses come from the rings alone.

What distinguishes fundamentally the seals for rotating motion from those for translation is that the mobile surface on which they effect the sealing is always essentially the same. This has important consequences as to the abrasion, heat production and release. Besides, much higher speeds can be reached. Moreover, the sealing can be achieved either directly on the shaft (radial seals), or else outside the shaft in the dynamic mode but along a direction parallel to the shaft axis (axial seals). A seal for rotating motion used under conditions of peripheral rotation speed and under a given fluid pressure can operate with other characteristics, provided that be respected the product PS (pressure . speed), equal to a constant (and expressed in Mpa. m s$^{-1}$). This is only true under well-determined conditions, especially concerning lubrication, shaft hardness and roughness etc., and for a well-defined operating life. In addition, there is a limit as to the pressure and the speed. The circular-section toric seal is suitable at low speeds (less than 0.5 m. s$^{-1}$) and at high pressures (up to 10 Mpa). A rough estimate of the PS factor is 1 for operating lives of about 200 to 500 h., and 0.1 for lives of about 5000 h., provided that there be a plentiful oil lubrication and that the shaft diameter be about 30 mm.

The lip seals are quite common. They consist of a metal frame with a L-section on which is overmolded an elastomer piece. The sealing takes place on the lip that must have a very reduced contact section with the shaft. The PS factor of the lip seals depends on the elastomer being used. It is about 0.5 for nitrile seals with a maximum peripheral speed of 15 m. s$^{-1}$ and 1.5 for seals in elastomer containing fluorine with a maximum speed of 25 m. s$^{-1}$. Their resistance to pressure is very low, usually less than 0.05 Mpa. Yet it is possible to work them under pressures up to 1 Mpa, the speeds then not exceeding a few meters per second.

The mechanical packings display the highest PS performances. A mechanical packing is a mechanical unit ensuring the sealing in rotation by means of two plane surfaces perpendicular to the rotation axis and in relative motion vis-à-vis each other. The operation of a mechanical packing is suitable provided that some imperatives be respected. The first one is that of an appropriate lubrication. The packings allow for very high performances that also depend on the precision of their implementation and on the nature of the materials, thus actually on their cost. They can be graded according to three categories:

usual applications: PV up to 1;
good-performance applications: PV up to 20;
very high performance applications: PV up to 300.
The price ratio between the first and the last ones can increase by a 100 factor, for a given size.

For low room temperatures, the effects resulting from the expansion are minimized by using distortable materials such as elastomers or plastics, and by using whenever necessary flexible shapes such as found in lip seals or herringbone seals.

For high room temperatures, these materials are replaced with metals but then the problem resulting from the expansion becomes critical. For the rotating parts, it is possible to design so-called mechanical packings in which the faces in contact are perpendicular to the rotation axis, but for the translation there is no satisfactory solutions. For a perfect sealing, the seal must be continuous, which leads, because of the expansion, to important frictions that limit the motion speed. Higher speeds will then entail sacrificing the quality of the sealing. For turbines is used a labyrinth system that, by not bringing the parts into contact, allows for very high speeds with a constant leakage of the fluid to be drained.

For the internal-combustion engines or the piston compressors, the expansion problem is eliminated by using split rings but, there too, there is a permanent leakage with subsequent pollution problems. The sealing is then improved by increasing the number of seals, but this is at the cost of the engine efficiency.

SUMMARY OF THE INVENTION

This invention aims at providing a continuous mechanical packing that can operate at high speeds with perfect sealing, and also, since its constitutive materials can withstand higher temperatures than the elastomers, at improving the PS product and widening its application field. Moreover, this invention can provide, for specific implementations, temperature compensation means, thus allowing for work at high temperature.

According to this invention, this goal is achieved by a pressure compensation maintaining the frictional force essentially constant when the pressure increases. In addition, can be added temperature compensation means that, whatever the expansion, will hold constant the contact diameter. Said temperature compensation means will preferably be designed by coupling materials with a different thermal coefficient such as steel, titanium, aluminum alloys, with a thermal expansion coefficient varying between 8 and 24 $10^{-6}$. Besides, the contact part of the packing can benefit from an anti-abrasion surface treatment with a very wide range of procedures applicable not only to metals and metal alloys but also to polymers, composites, ceramics, etc. These could be, for instance coatings in vapor-phase, obtained either chemically CVD, or physically PVD. The PVD and CVD coatings have an excellent resistance to abrasion and the DLC (Diamond-Like Carbon) coatings an excellent friction coefficient. Such a packing will not experience jamming.

A packing seal according to this invention presents definite advantages. Because of its pressure compensation, it enables to decrease the friction forces under high pressures, thus decreasing the abrasion and improving the efficiency. Besides, to ensure the radial elasticity of the packing, the lip will be as thin and as elastic as possible. In addition to the shape of the packing characterized by a particularly judicious section, are provided implementations in materials with variable Young's modulus, from polymers to steel alloys or ceramics.

The possibility of a thermal compensation eliminates the problem resulting from the expansion in the metal seals and provides a new tight packing seal when the only ones available so far are only operational at very low speeds and apply exclusively to mechanical packings used in rotation.

More precisely, this invention concerns a continuous mechanical packing seal with a lip, to be placed in a toroidal housing located in a first part in relative motion vis-à-vis a second part, said lip bearing on the second part so as to ensure the sealing between the packing and the second part, said packing being characterized in that it comprises such pressure compensation means that, under a pressure variation, the packing is distorted, which produces a slight motion of the lip bearing on the second part so as to hold essentially constant the bearing force of the lip on the second part.

If need be, the packing can comprise stress compensation means due to temperature. Said means affect the motion of the lip.

BRIEF DESCRIPTION OF THE DRAWING

A more detailed description of this invention will now follow, that refers to the attached drawings in which.

DETAILED DESCRIPTION OF PREFERRED EMBODIMENT

Figure 1:
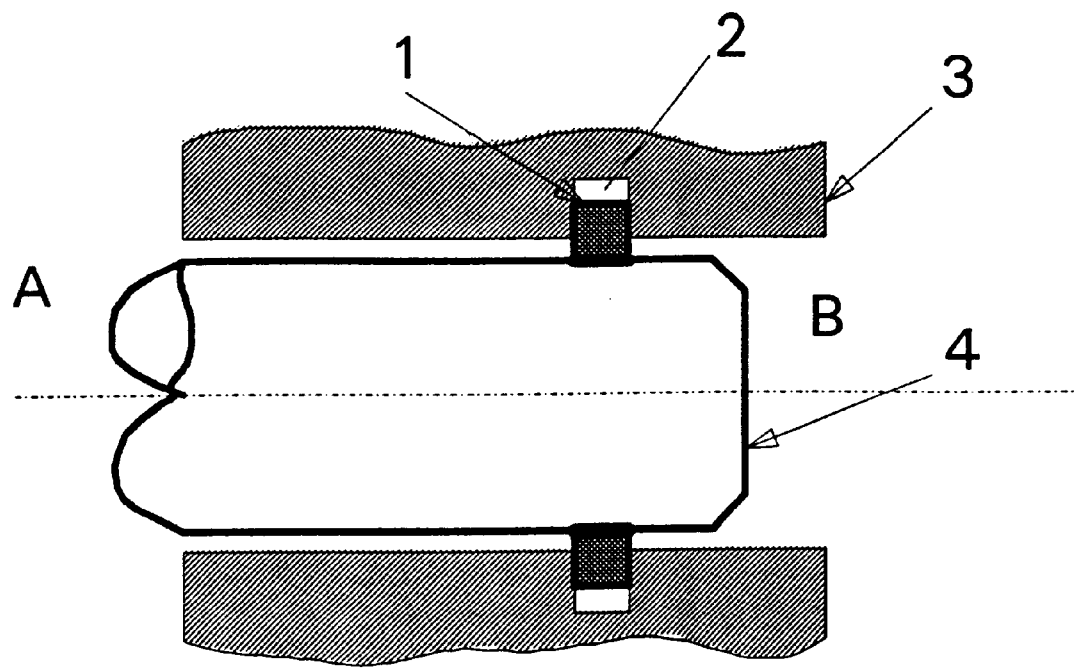
FIGS. 1 and 2 are sections showing piston-cylinder-packing units in relative translation and/or rotation motion.
Figure 2:
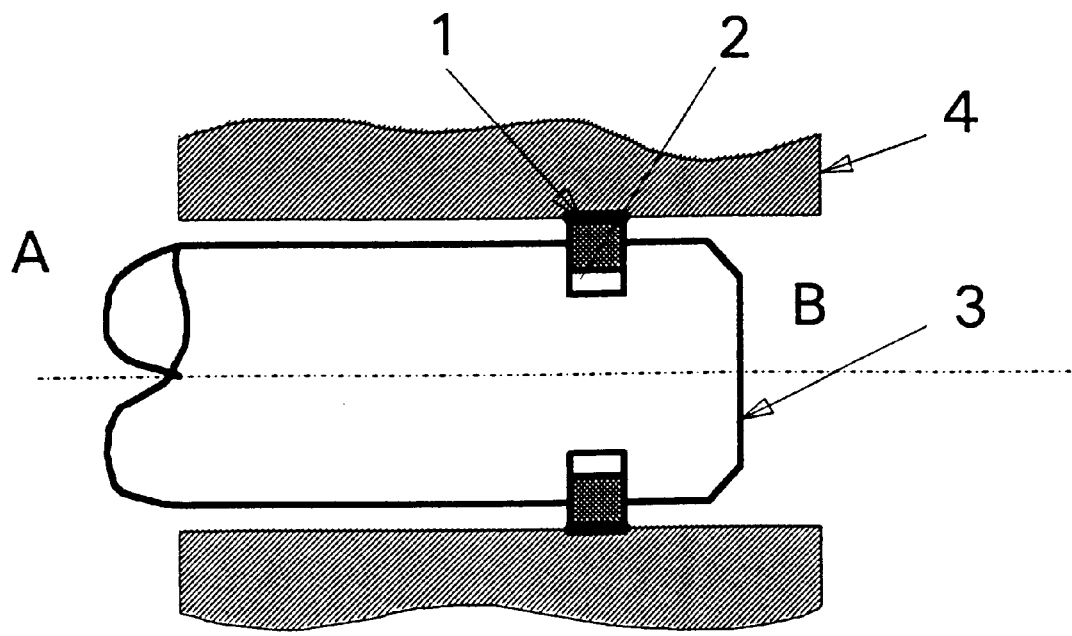

According to FIGS. 1 and 2 illustrating uses of this invention, the packing seal is placed in a groove 2 of a shape preferably toric with an essentially rectangular section. The groove 2 is designed either in the piston or in the cylinder. According to the implementation shown on FIGS. 1 and 2, the packing is generally housed in a groove with some radial clearance. Said packing separates the two volumes A and B on each side of the piston and the cylinder while ensuring the sealing.

Figure 3:
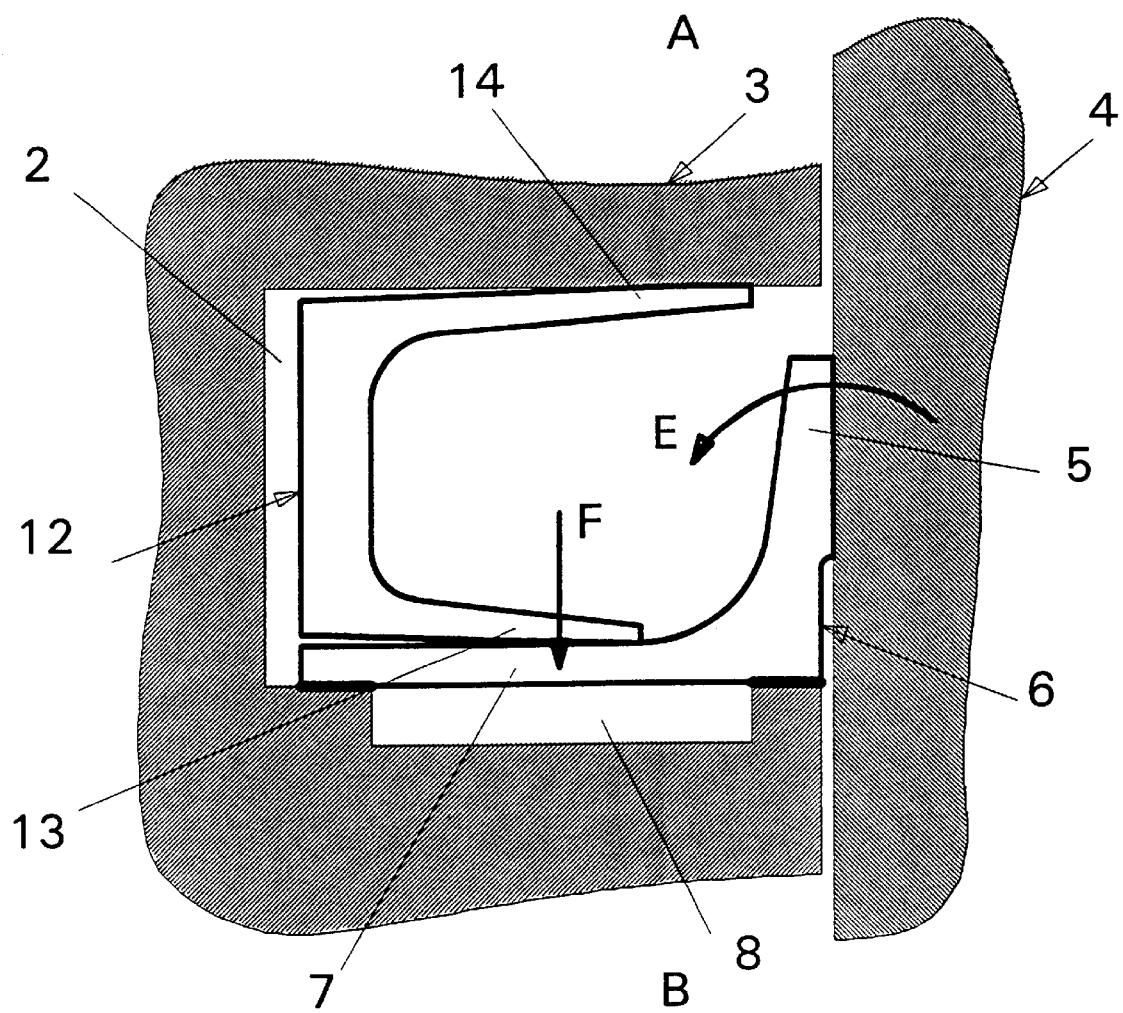
FIG. 3 is a section of the packing in the piston groove that shows one implementation of this invention.

As can be seen on FIG. 3, this invention concerns a continuous packing lip seal with a toroid shape, FIG. 3 showing only the torus section comprising the following rings:

- a unit 6 in the shape of a reverse L with a lip 5 bearing on a part 4 and a horizontal portion 7 bearing on the two extremities of the recess 8 cut in the housing 2 of the part 3, and
- a unit 12 in the shape of a reverse U with a leg of which the lip 13 is bearing on the upper face of the horizontal portion 7 and a leg of which the lip 14 is bearing on the upper face of the housing 2.

The lip 5 is provided with a thin abrasion-resistant layer obtained by the CVD and PVD coating techniques, designed to apply a pressure minimum yet sufficient to ensure the sealing in a plane transversal to the piston axis or the shaft rotating axis.

The implementation shown in FIG. 3 thus comprises pressure compensation means consisting of the elements 5, 7 and 8. Actually, when the differential pressure applied between the volumes A and B increases, it generates a force F on the horizontal portion 7 bearing on the edges of the recess 8, which flexes it downward and causes the lip 5 to rotate as shown by the arrow E countering the increase of the contact pressure of the lip 5 on the contact surface of the part 4. The toric piece 12 with a section in the shape of a reverse U provides the sealing between the packing 6 and the part 3 by means of its two lips 13 and 14. It is easily understood also that if the differential pressure between the volumes A and B decreases, the motion of the lip 5 occurs in the opposite direction to that of the arrow E, thus keeping essentially constant the bearing force of the lip 5 on the part 4. Contrary to a usual lip seal, instead of having a bearing effect on the cylinder or the piston proportional to the pressure, the contact effort of the lip 5 can be maintained essentially constant and independent of the pressure.

Figure 4:
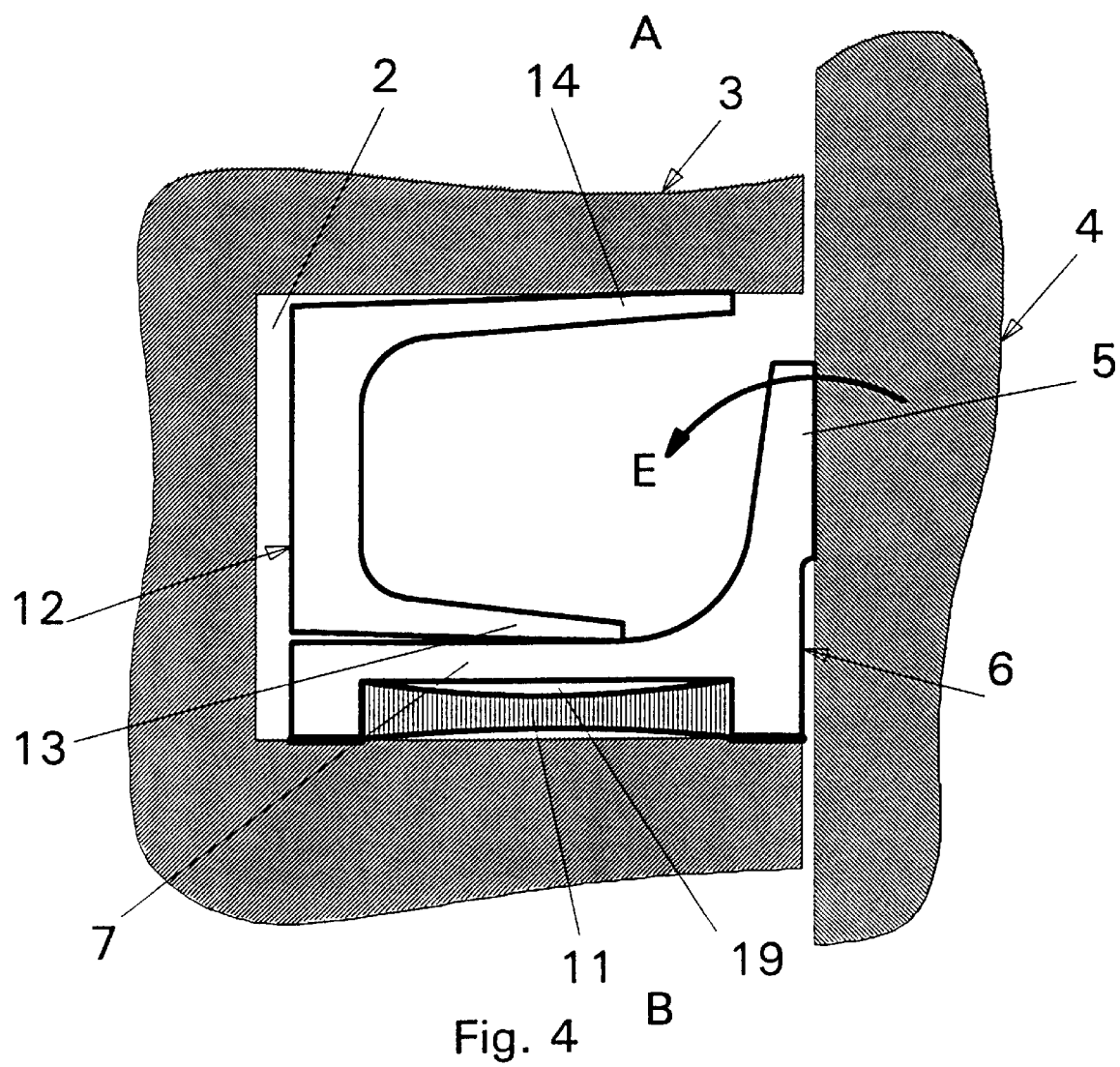
FIG. 4 is a section of the packing in the piston groove showing another implementation of this invention with temperature compensation.

FIG. 4 shows another implementation with a pressure compensation identical to that of FIG. 3 but in which the temperature compensation is performed by the insert 11. When the temperature increases, the packing is expanded and its diameter increased, which modifies the contact pressure of the lip 5 on the part 4. For this purpose, the insert 11 having a thermal expansion coefficient higher than that of the ring 6, it grows longer than the horizontal portion 7 of the ring 6 and, since it is embedded in said portion, this impels it to flex and the lip 5 to rotate, as in the aforementioned case about the pressure. A clearance 19 between the insert 11 and the horizontal portion 7 allows, as previously shown, the flexion of said horizontal portion 7 under the effect of pressure.

This invention, with its pressure compensation and, if need be, its temperature compensation, enables to establish during the operation a contact pressure allowing for the setting of a lubricant film. This invention allows to apply just enough bearing force of the lip 5 to ensure the sealing whatever the pressure and the temperature, hence to decrease the friction, thereby reducing the abrasion, decreasing the losses from friction and increasing the speed range.

Figure 5:
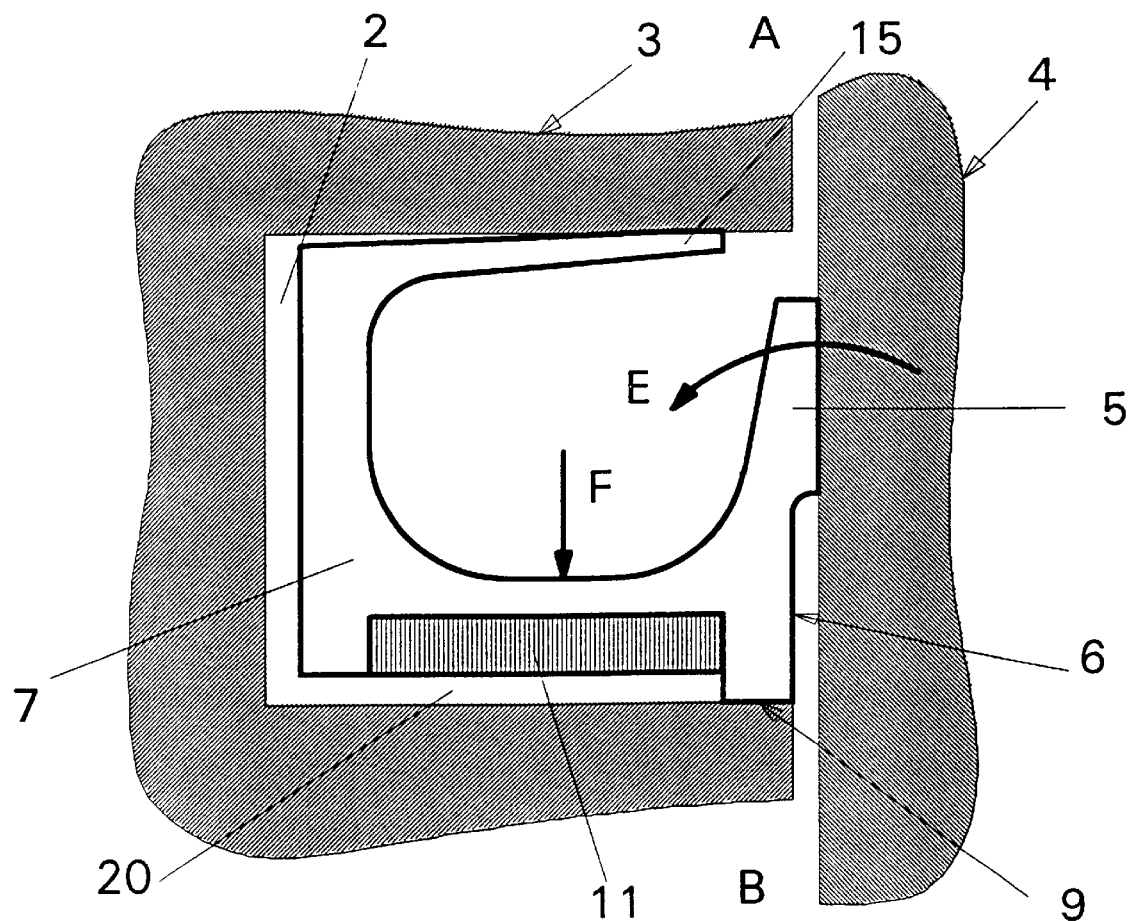
FIG. 5 is yet another implementation of this invention with the packing designed as a continuous part.

FIG. 5 shows a variation of the implementation of FIG. 4, the ring 6 being extended with a lip 15 in contact with the upper face of the groove 2 to ensure the sealing between the volumes A and B, and the lip 5 being extended downward to form the support surface 9 on the lower face of the groove 2.

When the pressure applied to the volume A increases, it generates a force F on the horizontal portion 7 of the ring 6, causing it to pivot around the surface 9 in the direction of the arrow E, the rotating motion of the lip 5 countering the increase of the contact pressure as seen on FIG. 4. Should there be a decrease of the pressure, the rotation motion would be in the opposite direction.

The space 20 between the bottom of the ring 6 and the lower part of the groove 2 allows for an easy pivoting of the ring around the support surface 9. The insert 11 as in FIG. 4 allows for temperature compensation.

Figure 6:
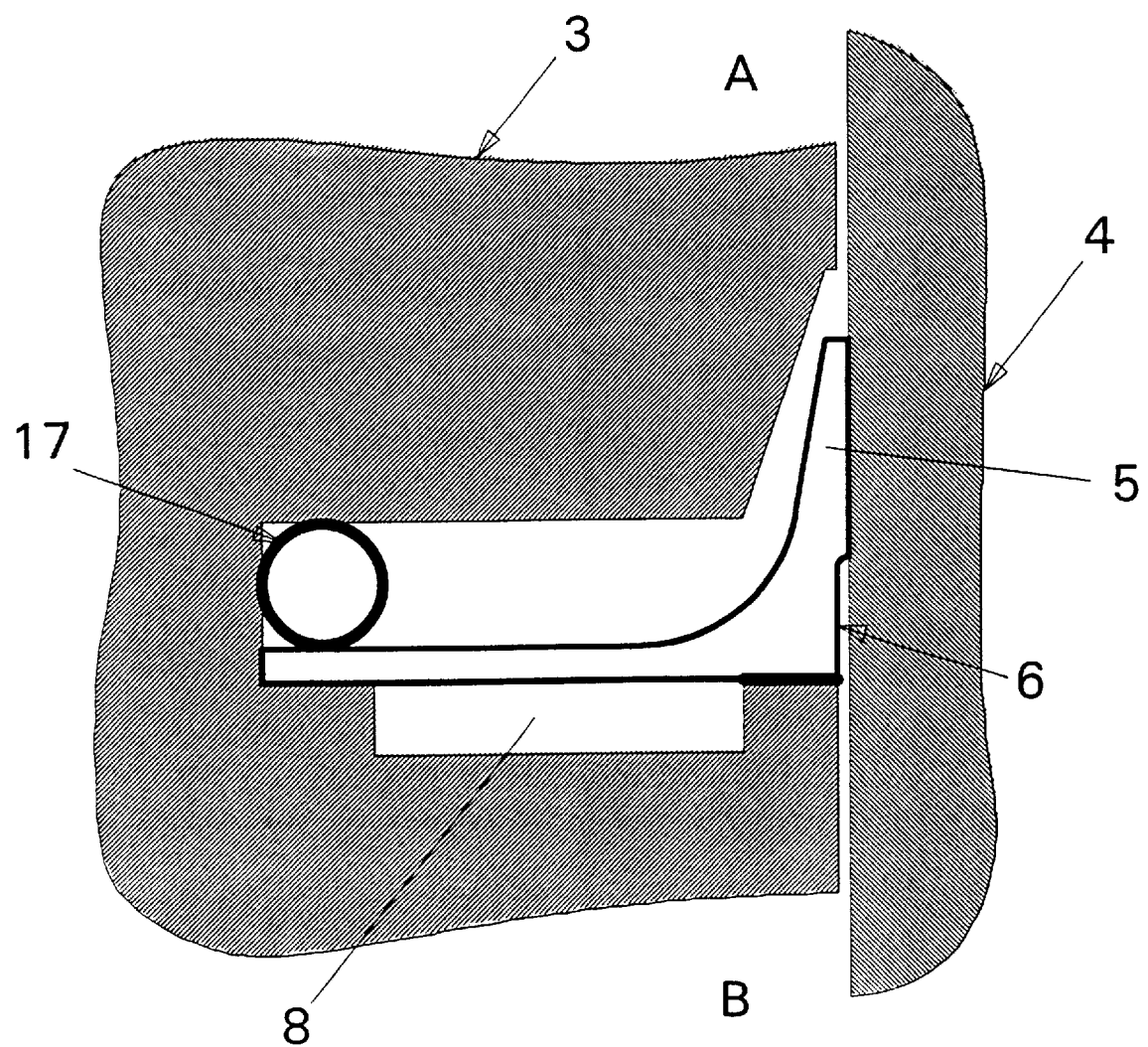
FIGS. 6 and 7 show the packing with part of the sealing implemented by a toric seal.
Figure 7:
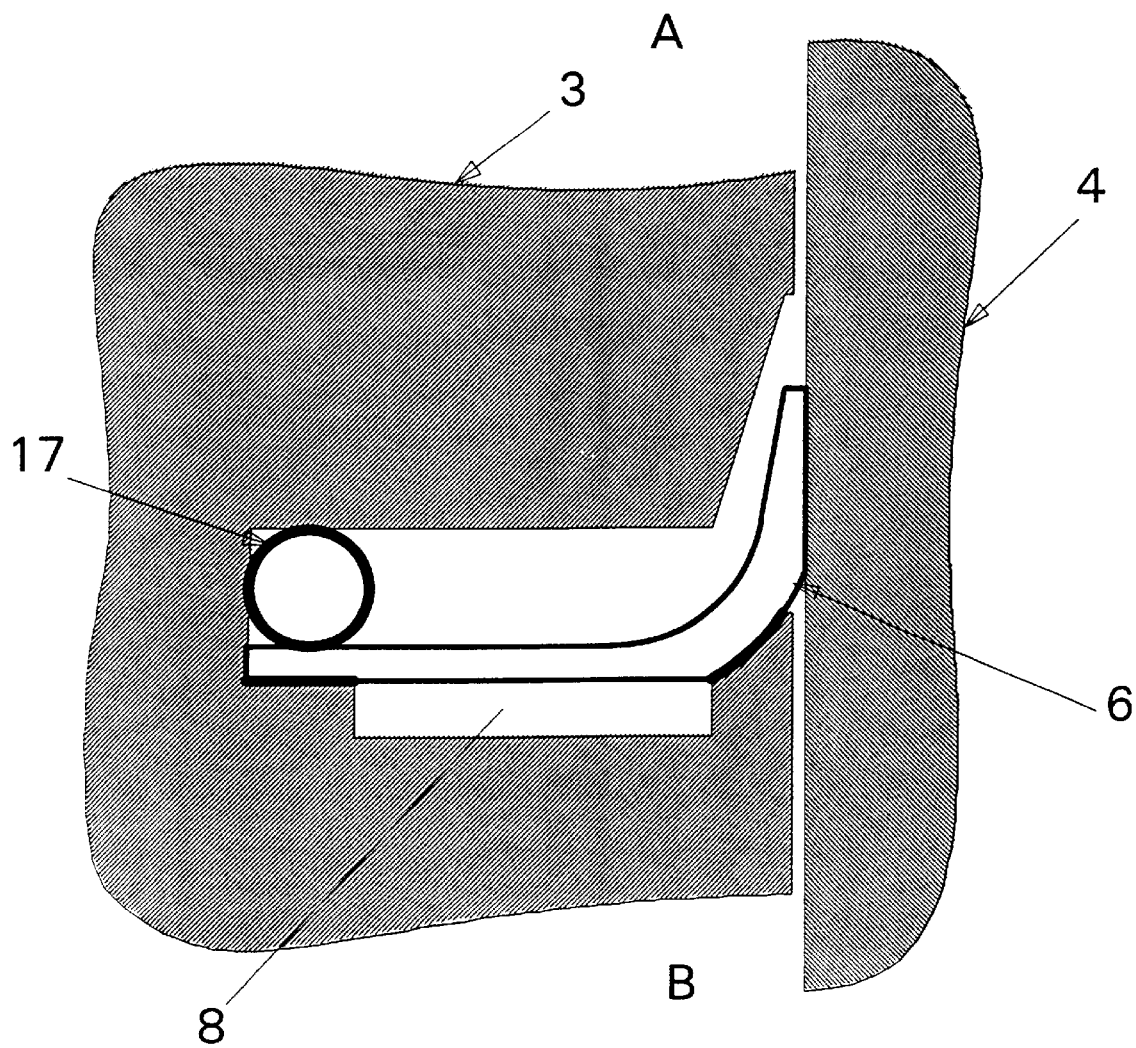

FIGS. 6 and 7 show other implementations of the packing, in which the unit 12 of FIG. 4 was replaced by a toric seal 17 with a circular section ensuring the sealing between the part 3 and the packing 6.

Figure 8:
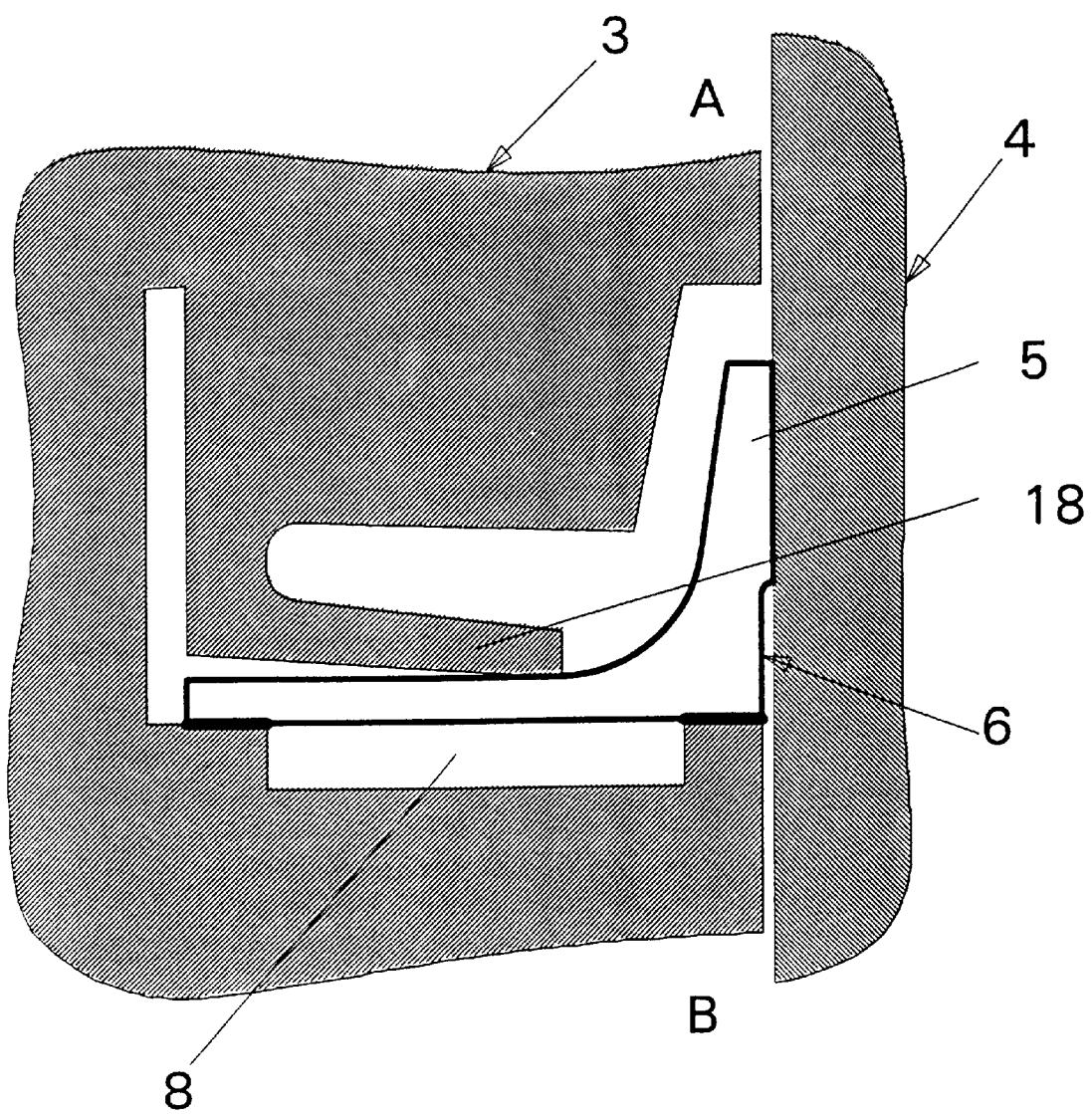
FIG. 8 shows another implementation variation using a seal lip integral with the piston.

FIG. 8 shows another implementation relatively to FIG. 4 in which the unit 12 was replaced with a lip 18 integral with the part 3 instead of the lip 13 of FIG. 4.

Figure 9:
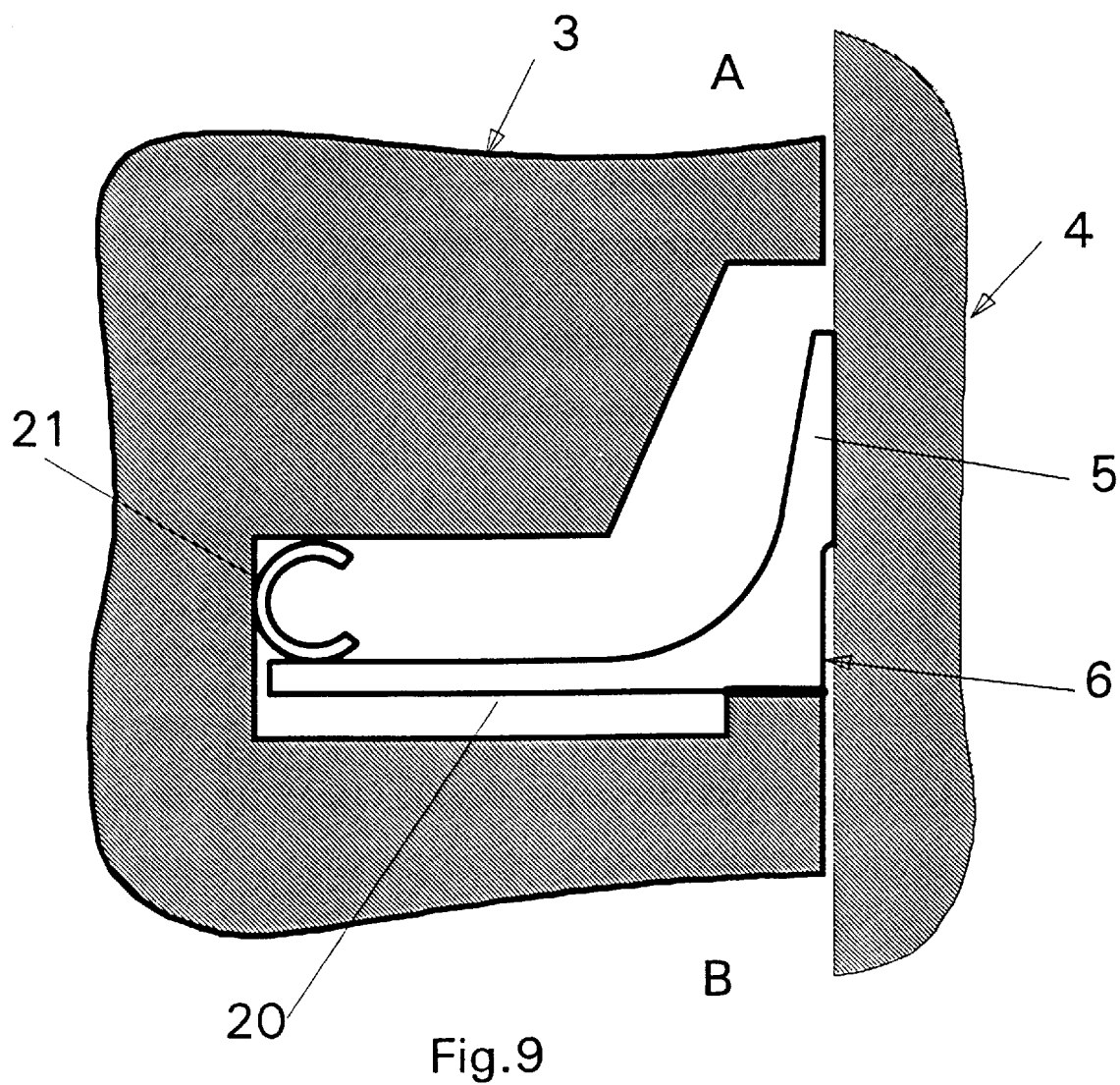
FIG. 9 shows another implementation variation in which some of the sealing is performed by a metal C-shaped seal.

FIG. 9 shows another implementation of the packing, in which the unit 12 of FIG. 4 was replaced with a metal seal 21 with a C-section ensuring the sealing between the part 3 and the packing 6.

According to this invention, the same sealing principles apply to both axial and rotation motions. Indeed, in the case of a version of the packing with a radial clearance, its immobilization in rotation can be automatically obtained by autoclavity of the lip 7. The resistant torsion torque of the packing at the level of the lip 7 will increase with the pressure, while the resistant torque at the level of the lip 5 will be more constant, according to the principle of compensation of the bearing pressure of the lip 5. The immobilization in torsion will preferably be performed by the sizings of the stiffness of the lips 5 and 7 so as to make it totally impossible to obtain first a rotation at the level of the lip 7. In order to immobilize the packing in rotation, any type of mechanical stops can be provided during the assembly.

Whatever the implementation, the packing according to this invention will advantageously be designed so that the bearing pressure of the lip can be constant and minimum under all conditions of pressure and temperature, yet high enough to provide a perfect sealing. Such a packing, manufactured according to the tribological properties of thin anti-abrasion layers obtained by coating techniques relative to CVD and PVD (carbides, nitrides, oxides, carbonitrides, Diamond carbon, doped metals, etc.] is immune to jamming. Moreover, the releases are reduced, preventing essentially any flow between the lip and the contactsurface, which can make this packing very instrumental in reducing the pollution from internal-combustion engines, power cylinders, turbines, compressors, etc.

What is claimed is:

1. A continuous mechanical packing seal with a packing seal lip placed in a slot of generally toroidal shape located in a first part which is mobile relative to a second part;
   the packing seal lip bearing on the second part so as to ensure the sealing between the packing seal and the second part;
   said packing seal comprising:
   pressure compensation means for producing, under the effect of a pressure variation, a distortion of the packing seal causing a slight motion of the packing seal lip bearing on the second part so as to maintain essentially constant the bearing force of the lip on said second part; and
   wherein the packing seal is essentially toroidal with a section in the shape of a reverse L having a vertical portion and a horizontal portion;
   the horizontal portion of the reverse L having an upper face;
   the vertical portion of the reverse L forming the packing seal lip; and
   the horizontal portion of the reverse L being distortable under pressure so as to obtain said slight motion;
   the packing seal comprising means for ensuring the sealing between the upper face of the horizontal portion of the reverse L and of the slot;
   said slot including a recess, the extremities of the horizontal portion of the reverse L bearing on the edges of said recess so that a pressure variation leads to a flexion of the horizontal portion of the reverse L, which causes a rotating displacement of the packing seal lip.

2. A packing seal according to claim 1, wherein the vertical portion of the reverse L is extended downward to form a bearing surface on the slot;
   wherein the horizontal portion of the reverse L and the packing seal lip pivot around the bearing surface under the effect of pressure, such pivoting being allowed by a clearance between the slot and the horizontal portion of the reverse L.

3. A packing seal according to claim 2, wherein the horizontal portion of the reverse L includes an insert with a thermal expansion coefficient higher than that of the horizontal portion of the reverse L;
   wherein a temperature variation causes a bending of the horizontal portion of the reverse L and thus a displacement of the packing seal lip.

4. A packing seal according to claim 1, wherein the horizontal portion of the reverse L includes an insert with a thermal expansion coefficient higher than that of the horizontal portion of the reverse L;
   wherein a temperature variation causes a bending of the horizontal portion of the reverse L and thus a displacement of the packing seal lip.

5. A packing seal according to claim 1, wherein the means for insuring the sealing between the upper face of the horizontal portion of the reverse L and of the slot consists of a toroidal part with a section in the shape of a reverse U having a first and second leg;
   the first and second legs of said reverse U being horizontal;
   the first leg coming to bear on the upper part of the horizontal portion of the reverse L; and
   the second leg coming to bear on the first part.

6. A packing seal according to claim 1, wherein the means for insuring the sealing between the upper face of the horizontal portion of the reverse L and of the slot consists of an extension of the horizontal portion of the reverse L coming to bear on the first part.

7. A packing seal according to claim 1, wherein the means for insuring the sealing between the upper face of the horizontal portion of the reverse L and of the slot consists of a toroidal seal bearing on both the upper part of the horizontal portion of the reverse L and the first part.

8. A packing seal according to claim 1, wherein the means for insuring the sealing between the upper face of the horizontal portion of the reverse L and of the slot consists of a tongue depending from the first part and bearing on the upper face of the horizontal portion of the L.

9. A continuous mechanical packing seal with a packing seal lip placed in a slot of generally toroidal shape located in a first part which is mobile relative to a second part,
   the packing seal lip bearing on the second part so as to ensure the sealing between the packing seal and the second part,
   said packing seal comprising:
   pressure compensation means for producing, under the effect of a pressure variation, a distortion of the packing seal causing a slight motion of the packing seal lip bearing on the second part so as to maintain essentially constant the bearing force of the lip on said second part; and
   wherein the packing seal is essentially toroidal with a section in the shape of a reverse L having a vertical portion and a horizontal portion;
   the horizontal portion of the reverse L having an upper face;
   the vertical portion of the reverse L forming the packing seal lip; and
   the horizontal portion of the reverse L being distortable under pressure so as to obtain said slight motion;
   the packing seal comprising means for ensuring the sealing between the upper face of the horizontal portion of the reverse L and of the slot;
   wherein a clearance is provided in the horizontal portion of the reverse L, between the extremities of the horizontal portion of the reverse L bearing on the second part so that a pressure variation leads to a flexion of the horizontal portion of the reverse L, which causes a rotating displacement of the packing seal lip.

10. A packing seal according to claim 9, wherein the horizontal portion of the reverse L includes an insert with a thermal expansion coefficient higher than that of the horizontal portion of the reverse L;
    wherein a temperature variation causes a bending of the horizontal portion of the reverse L and thus a displacement of the packing seal lip.

11. A packing seal according to claim 9, wherein the means for insuring the sealing between the upper face of the horizontal portion of the reverse L and of the slot consists of an extension of the horizontal portion of the reverse L coming to bear on the first part.

* * * * *